(12) United States Patent
Shuck

(10) Patent No.: US 10,113,679 B2
(45) Date of Patent: Oct. 30, 2018

(54) FLUID LINER WEAR INDICATOR FOR SUCTION MANIFOLD OF RECIPROCATING PUMP ASSEMBLY

(71) Applicant: S.P.M. Flow Control, Inc., Fort Worth, TX (US)

(72) Inventor: Charles Ben Shuck, Azle, TX (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 0 days.

(21) Appl. No.: 15/188,037

(22) Filed: Jun. 21, 2016

(65) Prior Publication Data
US 2016/0369926 A1 Dec. 22, 2016

Related U.S. Application Data

(60) Provisional application No. 62/183,141, filed on Jun. 22, 2015.

(51) Int. Cl.
*F16L 41/02* (2006.01)
*E21B 43/26* (2006.01)
(Continued)

(52) U.S. Cl.
CPC ............ *F16L 41/026* (2013.01); *E21B 43/26* (2013.01); *F04B 19/22* (2013.01); *F04B 53/14* (2013.01);
(Continued)

(58) Field of Classification Search
CPC ..... F16L 41/026; F16L 41/03; F16L 55/0332; F16L 55/041; F16L 57/06; E21B 43/26;
(Continued)

(56) References Cited

U.S. PATENT DOCUMENTS 2,873,227 A 2/1959 Olson et al.
3,373,695 A 3/1968 Yohpe
(Continued)

FOREIGN PATENT DOCUMENTS

CN 201753815 3/2011
GB 968347 A 9/1964

OTHER PUBLICATIONS

"Extended European Search Report dated Nov. 13, 2015 re Application No. 13741018.9, 8 pages."
(Continued)

*Primary Examiner* — Craig Schneider
*Assistant Examiner* — Kevin Barss
(74) *Attorney, Agent, or Firm* — Haynes and Boone, LLP

(57) ABSTRACT

A manifold through which a fluid is adapted to flow. The manifold includes an elongated member at least partially defining a fluid chamber through which the fluid is adapted to flow, a longitudinal axis, and an interior surface; a fluid liner disposed within the fluid chamber and adapted to dynamically respond to pressure fluctuations within the fluid chamber as the fluid flows therethrough; and a wear indicator positioned radially between the interior surface of the elongated member and the longitudinal axis. The fluid liner is subject to wear and/or erosion due to the flow of the fluid therethrough and/or the dynamic response of the fluid liner to the pressure fluctuations within the fluid chamber. The wear indicator is adapted to indicate the degree to which the fluid liner has been subjected to the wear and/or erosion.

22 Claims, 13 Drawing Sheets

(51) Int. Cl.
  *F04B 19/22* (2006.01)
  *F04B 53/14* (2006.01)
  *F04B 53/16* (2006.01)
  *F16L 57/06* (2006.01)
  *F16L 41/03* (2006.01)
  *F16L 55/033* (2006.01)
  *F16L 55/04* (2006.01)

(52) U.S. Cl.
  CPC .............. *F04B 53/16* (2013.01); *F16L 41/03* (2013.01); *F16L 55/0332* (2013.01); *F16L 55/041* (2013.01); *F16L 57/06* (2013.01); *F16L 2201/30* (2013.01); *Y10T 137/8158* (2015.04)

(58) Field of Classification Search
  CPC .......... F04B 19/22; F04B 53/14; F04B 53/16; Y10T 137/8158
  See application file for complete search history.

(56) References Cited

U.S. PATENT DOCUMENTS

| | | | |
|---|---|---|---|
| 3,437,467 A | 4/1969 | Floyd | |
| 3,799,196 A | 3/1974 | Scheitlin et al. | |
| 4,349,403 A | 9/1982 | Blenner et al. | |
| 4,712,578 A | 12/1987 | White | |
| 4,886,009 A | 12/1989 | Gondar et al. | |
| 4,922,958 A | 5/1990 | Lemp | |
| 5,228,478 A * | 7/1993 | Kleisle | B65G 53/523 116/208 |
| 5,823,093 A | 10/1998 | Kugelev et al. | |
| 5,860,452 A | 1/1999 | Ellis | |
| 5,947,053 A * | 9/1999 | Burnham | G01N 17/00 116/208 |
| 5,950,575 A | 9/1999 | Simons et al. | |
| 6,089,837 A | 7/2000 | Cornell | |
| 6,109,304 A | 8/2000 | Wolf et al. | |
| 6,651,698 B1 | 11/2003 | Wilkes | |
| 6,686,752 B1 * | 2/2004 | Heumann | B01D 45/12 324/700 |
| 7,252,071 B2 | 8/2007 | Kochanowski et al. | |
| 7,278,837 B2 | 10/2007 | Malmberg et al. | |
| 7,354,256 B1 | 4/2008 | Cummins | |
| 7,404,491 B2 * | 7/2008 | Hakola | B01D 45/12 209/715 |
| 7,409,775 B2 * | 8/2008 | Kuhman | G01N 3/56 33/542 |
| 7,524,173 B2 | 4/2009 | Cummins | |
| 7,621,728 B2 | 11/2009 | Miller et al. | |
| 8,105,055 B2 | 1/2012 | Small | |
| 8,444,398 B2 | 5/2013 | Brunet et al. | |
| 8,899,940 B2 | 12/2014 | Leugemors et al. | |
| 9,441,776 B2 | 9/2016 | Byrne et al. | |
| 2002/0108660 A1 | 8/2002 | Braun et al. | |
| 2005/0248334 A1 | 11/2005 | Dagenais et al. | |
| 2005/0275216 A1 * | 12/2005 | Martin | B65G 53/523 285/45 |
| 2005/0276708 A1 | 12/2005 | Miller et al. | |
| 2006/0225705 A1 | 10/2006 | Kochanowski et al. | |
| 2008/0276998 A1 | 11/2008 | Boyher et al. | |
| 2010/0068508 A1 * | 3/2010 | Shinde | G01N 3/56 428/332 |
| 2011/0110793 A1 | 5/2011 | Leugemors et al. | |
| 2012/0024413 A1 | 2/2012 | Yang et al. | |
| 2013/0071256 A1 * | 3/2013 | Kent | F04B 49/10 417/1 |
| 2014/0130887 A1 * | 5/2014 | Byrne | F04B 11/0008 137/15.01 |
| 2014/0137963 A1 | 5/2014 | Blume | |
| 2014/0251486 A1 * | 9/2014 | Gunsing | F16L 11/081 138/139 |
| 2015/0300332 A1 | 10/2015 | Kotapish et al. | |
| 2016/0341347 A1 | 11/2016 | Byrne et al. | |

OTHER PUBLICATIONS

"First Chinese Office Action dated Dec. 2, 2015 re Chinese Application No. 201380016207.1, 26 pages."
"International Preliminary Report on Patentability by the IPEA/US, dated Jan. 14, 2014, re PCT/US2013/022938, 6 pages."
"International Search Report and Written Opinion for PCT/US2013/022938, dated Mar. 29, 2013, 9 pages."
"International Search Report and Written Opinion for PCT/US2016/038474, dated Oct. 5, 2016, 9 pages."
"Notice of Allowance dated May 3, 2016 in U.S. Appl. No. 13/749,025, 8 pages."
"Office Action dated Aug. 31, 2015 in U.S. Appl. No. 13/749,025, 25 pages."
"Office Action dated Feb. 11, 2016 in U.S. Appl. No. 13/749,025, 25 pages."
"Office Action dated Mar. 30, 2015 in U.S. Appl. No. 13/749,025, 7 pages."

* cited by examiner

FLUID LINER WEAR INDICATOR FOR SUCTION MANIFOLD OF RECIPROCATING PUMP ASSEMBLY

CROSS-REFERENCE TO RELATED APPLICATION

This application claims the benefit of the filing date of, and priority to, U.S. Application No. 62/183,141, filed Jun. 22, 2015, the entire disclosure of which is hereby incorporated herein by reference.

TECHNICAL FIELD

The present disclosure relates generally to a reciprocating pump and, more specifically, to enhancing the performance, reliability, and/or capacity of the reciprocating pump by equipping a fluid liner of the suction manifold of the reciprocating pump with a wear indicator according to the present disclosure.

BACKGROUND OF THE DISCLOSURE

Various pumps are used in connection with oilfield operations such as, for example, cementing, acidizing, or fracturing of a subterranean wellbore. During such operations, these pumps are often subject to short and frequent duty cycles, and are required to deliver a fluid or slurry to the wellbore at pressures up to 20,000 psi. An exemplary pump for oilfield operations is a reciprocating pump. A manifold may supply a fluid to the reciprocating pump, and may distribute the fluid to different pressure chambers within a fluid end portion of the reciprocating pump. A fluid liner may be disposed within the manifold and adapted to dynamically respond to pressure fluctuations within the manifold as the fluid flows therethrough. The fluid liner is subject to wear and/or erosion due to the flow of the fluid therethrough and/or the dynamic response of the fluid liner to the pressure fluctuations within the manifold as the fluid flows therethrough. Therefore, what is needed is an apparatus, manifold, or method that addresses one or more of the foregoing issues, among other issues.

SUMMARY

In a first aspect, there is provided a manifold through which a fluid is adapted to flow, the manifold including an elongated member at least partially defining a fluid chamber through which the fluid is adapted to flow, a longitudinal axis, and an interior surface, the elongated member including one or more inlets via which the fluid flows into the fluid chamber; and one or more outlets via which the fluid flows out of the fluid chamber; a fluid liner disposed within the fluid chamber and adapted to dynamically respond to pressure fluctuations within the fluid chamber as the fluid flows therethrough; and a wear indicator, at least a portion of which is embedded in the fluid liner and positioned radially between the interior surface of the elongated member and the longitudinal axis; wherein the fluid liner is subject to wear and/or erosion due to the flow of the fluid therethrough and/or the dynamic response of the fluid liner to the pressure fluctuations within the fluid chamber as the fluid flows therethrough; and wherein the wear indicator is adapted to indicate the degree to which the fluid liner has been subjected to the wear and/or erosion.

In an exemplary embodiment, the wear indicator includes a plurality of separate segments that are graduated, or stepped, with respect to one another; and wherein at least a portion of each of the respective segments is embedded in the fluid liner.

In another exemplary embodiment, the wear indicator forms an annular ring defining a cross section and extending circumferentially about the longitudinal axis of the elongated member.

In yet another exemplary embodiment, the wear indicator is in contact with the interior surface of the elongated member.

In certain exemplary embodiments, at least a portion of the fluid liner extends between the wear indicator and the interior surface of the elongated member so that the wear indicator does not contact the interior surface of the elongated member.

In an exemplary embodiment, the fluid liner covers the wear indicator so that at least a portion of the fluid liner extends between the wear indicator and the longitudinal axis of the elongated member, thereby preventing the fluid that flows through the fluid chamber from contacting the wear indicator.

In another exemplary embodiment, the fluid liner does not cover at least a portion of the wear indicator, thereby allowing the fluid that flows through the fluid chamber to contact the wear indicator.

In yet another exemplary embodiment, the wear indicator is formed of a first material and the fluid liner is formed of a second material that is different from the first material; and, when the fluid flows through the fluid chamber, the first material erodes at a first rate and the second material erodes at a second rate.

In certain exemplary embodiments, the first rate is greater than or equal to the second rate.

In an exemplary embodiment, the first rate is less than the second rate.

In a second aspect, there is provided a reciprocating pump assembly, the fluid end portion including: a fluid end block, the fluid end block including a pressure chamber, a plunger adapted to reciprocate within the pressure chamber, and a discharge manifold in fluid communication with the pressure chamber; and a suction manifold through which a fluid is adapted to flow, wherein the suction manifold is connected to the fluid end block, and wherein the suction manifold includes an elongated member at least partially defining a fluid chamber through which the fluid is adapted to flow, a longitudinal axis, and an interior surface, the elongated member including an inlet via which the fluid flows into the fluid chamber, and an outlet via which the fluid flows out of the fluid chamber, the outlet being in fluid communication with the pressure chamber; a fluid liner disposed within the fluid chamber and adapted to dynamically respond to pressure fluctuations within the fluid chamber as the fluid flows therethrough; and a wear indicator, at least a portion of which is embedded in the fluid liner and positioned radially between the interior surface of the elongated member and the longitudinal axis; wherein the fluid liner is subject to wear and/or erosion due to the flow of the fluid therethrough and/or the dynamic response of the fluid liner to the pressure fluctuations within the fluid chamber as the fluid flows therethrough; and wherein the wear indicator is adapted to indicate the degree to which the fluid liner has been subjected to the wear and/or erosion.

In an exemplary embodiment, the wear indicator includes a plurality of separate segments that are graduated, or stepped, with respect to one another; and wherein at least a portion of each of the respective segments is embedded in the fluid liner.

In another exemplary embodiment, the wear indicator forms an annular ring defining a cross section and extending circumferentially about the longitudinal axis of the elongated member.

In yet another exemplary embodiment, the wear indicator is in contact with the interior surface of the elongated member.

In certain exemplary embodiments, at least a portion of the fluid liner extends between the wear indicator and the interior surface of the elongated member so that the wear indicator does not contact the interior surface of the elongated member.

In an exemplary embodiment, the fluid liner covers the wear indicator so that at least a portion of the fluid liner extends between the wear indicator and the longitudinal axis of the elongated member, thereby preventing the fluid that flows through the fluid chamber from contacting the wear indicator.

In another exemplary embodiment, the fluid liner does not cover at least a portion of the wear indicator, thereby allowing the fluid that flows through the fluid chamber to contact the wear indicator.

In yet another exemplary embodiment, the wear indicator is formed of a first material and the fluid liner is formed of a second material that is different from the first material; and, when the fluid flows through the fluid chamber, the first material erodes at a first rate and the second material erodes at a second rate.

In certain exemplary embodiments, the first rate is greater than or equal to the second rate.

In an exemplary embodiment, the first rate is less than the second rate.

In a third aspect, there is provided a manifold through which a fluid is adapted to flow, the manifold including an elongated member at least partially defining a fluid chamber through which the fluid is adapted to flow, a longitudinal axis, and an interior surface, the elongated member including: one or more inlets via which the fluid flows into the fluid chamber; and one or more outlets via which the fluid flows out of the fluid chamber; a fluid liner disposed within the fluid chamber and adapted to dynamically respond to pressure fluctuations within the fluid chamber as the fluid flows therethrough; and a wear indicator positioned radially between the interior surface of the elongated member and the longitudinal axis, the wear indicator including at least one of: a wear body embedded in the fluid liner; and a wear groove formed in the fluid liner; wherein the fluid liner is subject to wear and/or erosion due to the flow of the fluid therethrough and/or the dynamic response of the fluid liner to the pressure fluctuations within the fluid chamber as the fluid flows therethrough; and wherein the wear indicator is adapted to indicate the degree to which the fluid liner has been subjected to the wear and/or erosion.

In an exemplary embodiment, the wear indicator includes the wear body, the wear body including a plurality of separate body segments that are graduated, or stepped, with respect to one another, at least respective portions of the body segments of the wear body being embedded in the fluid liner.

In another exemplary embodiment, the wear indicator includes the wear body, the wear body forming an annular ring extending circumferentially about the longitudinal axis of the elongated member.

In yet another exemplary embodiment, the wear indicator includes the wear body, the wear body being in contact with the interior surface of the elongated member.

In certain exemplary embodiments, the wear indicator includes the wear body, at least a portion of the fluid liner extending between the wear body and the interior surface of the elongated member so that the wear body does not contact the interior surface of the elongated member.

In an exemplary embodiment, the wear indicator includes the wear body, the fluid liner covering the wear body so that at least a portion of the fluid liner extends between the wear body and the longitudinal axis of the elongated member, thereby initially preventing the fluid that flows through the fluid chamber from contacting the wear body.

In another exemplary embodiment, the wear indicator includes the wear body, the wear body being formed of a first material and the fluid liner being formed of a second material that is different from the first material; and, when the fluid flows through the fluid chamber, the first material erodes at a first rate and the second material erodes at a second rate.

In yet another exemplary embodiment, the wear indicator includes the wear groove, the wear groove including a plurality of separate groove segments that are graduated, or stepped, with respect to one another.

In certain exemplary embodiment, the wear indicator includes the wear groove, the wear groove forming an annular groove extending circumferentially about the longitudinal axis of the elongated member.

In an exemplary embodiment, the wear indicator includes the wear groove, the wear groove being formed in the interior of the fluid liner.

In a fourth aspect, there is provided a fluid end portion for a reciprocating pump assembly, the fluid end portion including a fluid end block, including: a pressure chamber; a plunger adapted to reciprocate within the pressure chamber; and a discharge manifold in fluid communication with the pressure chamber; and a suction manifold through which a fluid is adapted to flow, the suction manifold being connected to the fluid end block and including: an elongated member at least partially defining a fluid chamber through which the fluid is adapted to flow, a longitudinal axis, and an interior surface, the elongated member including: an inlet via which the fluid flows into the fluid chamber; and an outlet via which the fluid flows out of the fluid chamber, the outlet being in fluid communication with the pressure chamber; a fluid liner disposed within the fluid chamber and adapted to dynamically respond to pressure fluctuations within the fluid chamber as the fluid flows therethrough; and a wear indicator positioned radially between the interior surface of the elongated member and the longitudinal axis, the wear indicator including at least one of: a wear body embedded in the fluid liner; and a wear groove formed in the fluid liner; wherein the fluid liner is subject to wear and/or erosion due to the flow of the fluid therethrough and/or the dynamic response of the fluid liner to the pressure fluctuations within the fluid chamber as the fluid flows therethrough; and wherein the wear indicator is adapted to indicate the degree to which the fluid liner has been subjected to the wear and/or erosion.

In an exemplary embodiment, the wear indicator includes the wear body, the wear body including a plurality of separate body segments that are graduated, or stepped, with respect to one another, at least respective portions of the body segments of the wear body being embedded in the fluid liner.

In another exemplary embodiment, the wear indicator includes the wear body, the wear body forming an annular ring extending circumferentially about the longitudinal axis of the elongated member.

In yet another exemplary embodiment, the wear indicator includes the wear body, the wear body being in contact with the interior surface of the elongated member.

In certain exemplary embodiments, the wear indicator includes the wear body, at least a portion of the fluid liner extending between the wear body and the interior surface of the elongated member so that the wear body does not contact the interior surface of the elongated member.

In an exemplary embodiment, the wear indicator includes the wear body, the fluid liner covering the wear body so that at least a portion of the fluid liner extends between the wear body and the longitudinal axis of the elongated member, thereby preventing the fluid that flows through the fluid chamber from contacting the wear body.

In another exemplary embodiment, the wear indicator includes the wear body, the wear body being formed of a first material and the fluid liner being formed of a second material that is different from the first material; and, when the fluid flows through the fluid chamber, the first material erodes at a first rate and the second material erodes at a second rate.

In yet another exemplary embodiment, the wear indicator includes the wear groove, the wear groove including a plurality of separate groove segments that are graduated, or stepped, with respect to one another.

In certain exemplary embodiments, the wear indicator includes the wear groove, the wear groove forming an annular groove extending circumferentially about the longitudinal axis of the elongated member.

In an exemplary embodiment, the wear indicator includes the wear groove, the wear groove being formed in the interior of the fluid liner.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
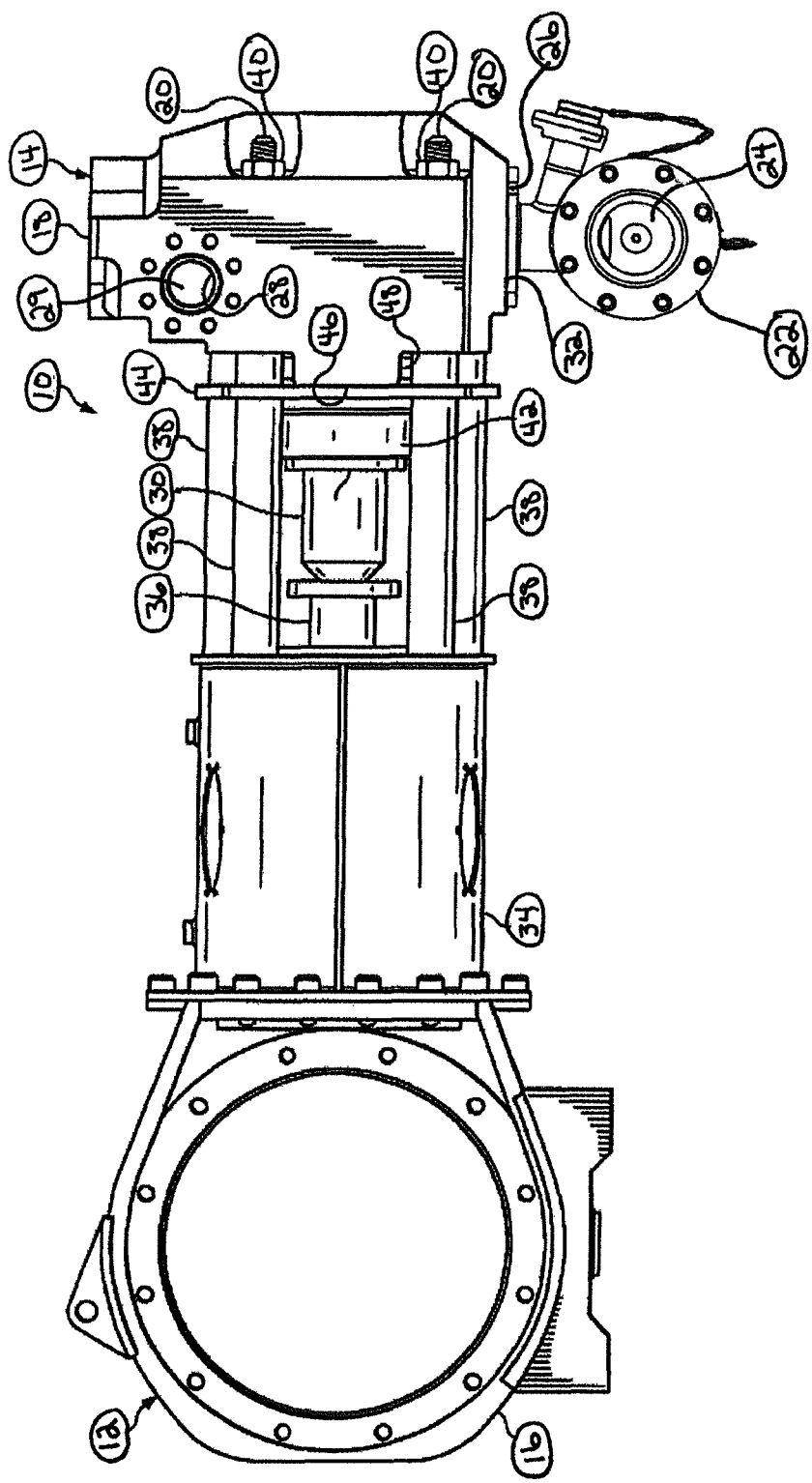
FIG. 1 is an elevational view of a reciprocating pump assembly including a power end portion and a fluid end portion, the fluid end portion including a manifold, according to an exemplary embodiment.

In an exemplary embodiment, as illustrated in FIG. 1, a reciprocating pump assembly is generally referred to by the reference numeral 10 and includes a power end portion 12 and a fluid end portion 14 operably coupled thereto. The power end portion 12 includes a crankshaft housing 16 in which a crankshaft (not shown) is disposed, the crankshaft being operably coupled to an engine or motor (not shown), which is adapted to drive the crankshaft. The fluid end portion 14 includes a fluid end block 18, which is connected to the crankshaft housing 16 via a plurality of stay rods 20, two of which are shown in FIG. 1. An inlet such as, for example, a suction manifold 22 is connected to the fluid end block 18 and includes an interior passage 24 and a mounting plate 26. The structure of the suction manifold 22 will be discussed in further detail below. The fluid end block 18 also includes a discharge manifold 28 that defines an interior passage 29, which is spaced in a parallel relation from the interior passage 24 of the suction manifold 22. The fluid end block 18 includes a plurality of pressure chambers (not shown) formed therein so that each pressure chamber is in fluid communication with each of the interior passage 24 of the suction manifold 22 and the interior passage 29 of the discharge manifold 28. The fluid end portion 14 further includes a plurality of plungers 30 that are received by, and extend within, the respective pressure chambers. The plungers 30 and their respective pressure chambers are arranged transversely across the fluid end portion 14. Further, each plunger 30 is adapted to reciprocate within the corresponding pressure chamber during operation of the reciprocating pump assembly 10. The mounting plate 26 of the suction manifold 22 mates against a bottom surface 32 of the fluid end block 18.

A stationary crosshead housing 34 is connected to the crankshaft housing 16. In several exemplary embodiments, the stationary crosshead housing 34 is part of the crankshaft housing 16. A plurality of pony rods 36 extend out of the stationary crosshead housing 34. Respective ones of the plungers 30 are connected to the pony rods 36, respectively. One of the pony rods 36, and the corresponding plunger 30 connected thereto, are shown in FIG. 1. A plurality of sleeves 38 (four shown in FIG. 1) extend between the stationary crosshead housing 34 and the fluid end block 18. The stay rods 20 extend from at least the crankshaft housing 16, through the stationary crosshead housing 34, through respective ones of the sleeves 38, and through respective bores (not shown) formed in the fluid end block 18. The stay rods 20 include respective threaded ends, which are threadably engaged with respective nuts 40 to connect the fluid end block 18 to the crankshaft housing 16.

The fluid end block 18 further includes a plurality of integrally formed bosses 42 (one shown in FIG. 1) which protrude towards the crankshaft housing 16. A nose plate, or an alignment plate 44, is engaged with a surface 46 of the fluid end block 18. The surface 46 is defined by an integrally formed web 48 of the fluid end block 18, from which the bosses 42 protrude. The sleeves 38 extend through the alignment plate 44 and engage the fluid end block 18.

In several exemplary embodiments, each of the bosses 42 may be characterized as, or may be a part of, a packing gland. Since the bosses 42 are integrally formed with the fluid end block 18, each of the bosses 42 may be characterized as, or may be a part of, an integrated packing gland. In an exemplary embodiment, instead of being integrally formed with the fluid end block 18, each of the bosses 42 may be connected to the fluid end block 18 using fasteners such as, for example, bolts. In an exemplary embodiment, instead of being integrally formed with the fluid end block 18, the bosses 42 and the web 48 may be connected to the fluid end block 18 using fasteners such as, for example, bolts.

In several exemplary embodiments, the combination of at least each pressure chamber and the corresponding plunger 30 may be characterized as a plunger throw. The reciprocating pump assembly 10 may be a triplex pump with the fluid end portion 14 having a set of three plunger throws, each including respective ones of the pressure chambers and the plungers 30. Although the reciprocating pump assembly 10 could be a triplex pump, as described above, the reciprocating pump assembly 10 may alternatively include any number of plunger throws such as, for example, one plunger throw, two plunger throws (duplex pump), four plunger throws (quadriplex pump), five plunger throws (quintuplex pump), or more.

During operation, in several exemplary embodiments, the power end portion 12 is adapted to cause the plungers 30, one of which is shown in FIG. 1, to reciprocate in and out of the pressure chambers, respectively, thereby causing fluid to be: sucked into one or more of the pressure chambers via the interior passage 24 of the suction manifold 22; pressurized in the one or more of the pressure chambers; and discharged out of the fluid end block 18 via the interior passage 29 of the discharge manifold 28. In several exemplary embodiments, the reciprocating pump assembly 10 is used in connection with various oilfield operations such as, for example, cementing, acidizing, or fracturing of a subterranean wellbore. During such operations, these reciprocating pumps are often subject to short and frequent duty cycles, and are required to deliver a fluid or slurry to the wellbore at pressures up to 20,000 psi. In an exemplary embodiment, the reciprocating pump assembly is configured to conduct cementing and/or acidizing operations within an oil and gas well. In an exemplary embodiment, the reciprocating pump assembly 10 is a mud pump, or a hydraulic fracturing pump, which is configured to hydraulically fracture (or "frac") an oil and gas well. In an exemplary embodiment, the reciprocating pump assembly 10 is a pump suitable for performing high pressure fracturing operations, and may be used to obtain pressures of about 20,000 psi or more. In an exemplary embodiment, the reciprocating pump assembly 10 is a pump suitable for performing high pressure fracturing operations, and may be used to obtain pressures of less than about 20,000 psi.

Figure 2:
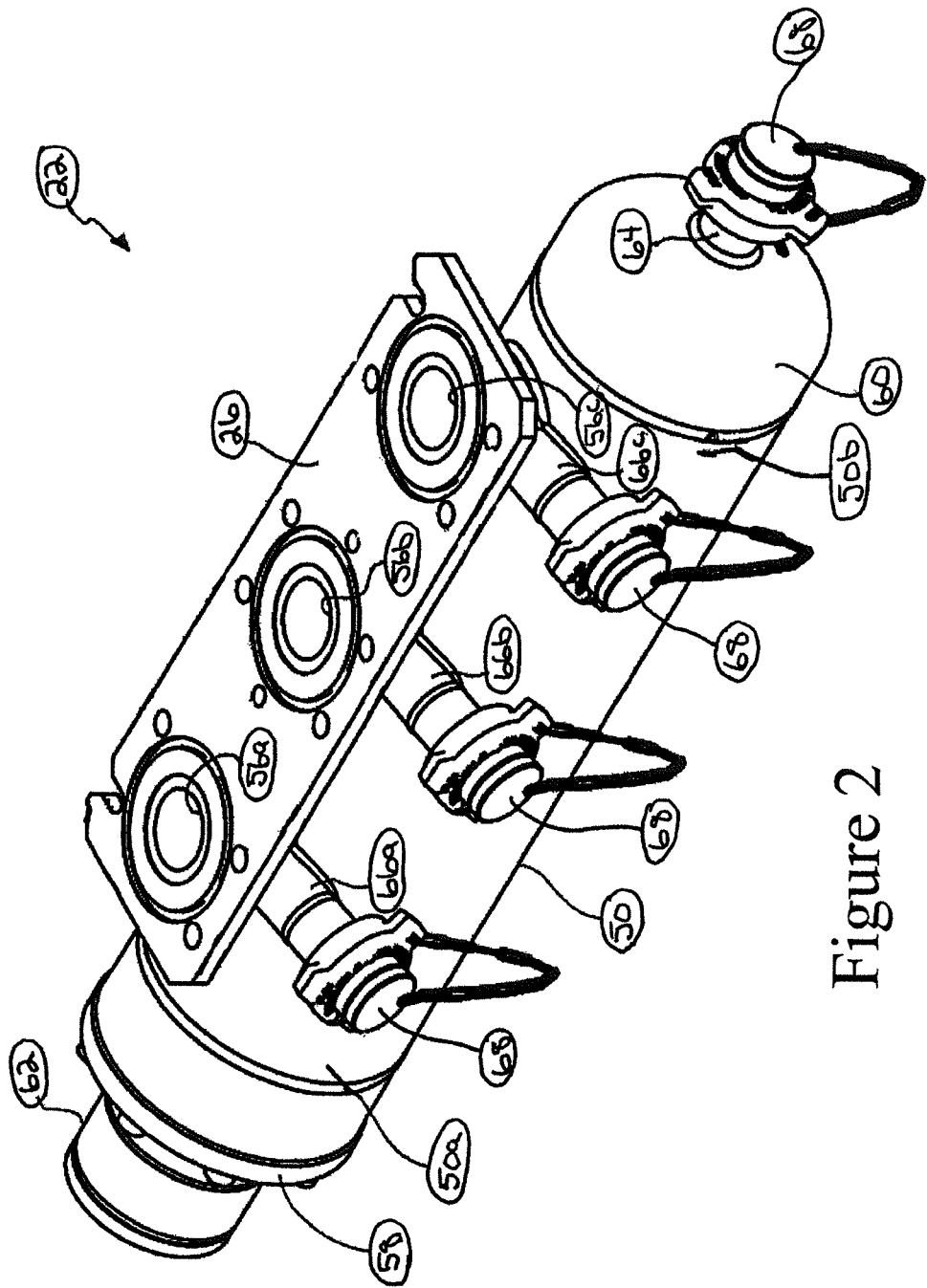
FIG. 2 is a perspective view of the manifold of FIG. 1, according to an exemplary embodiment.
Figure 3:
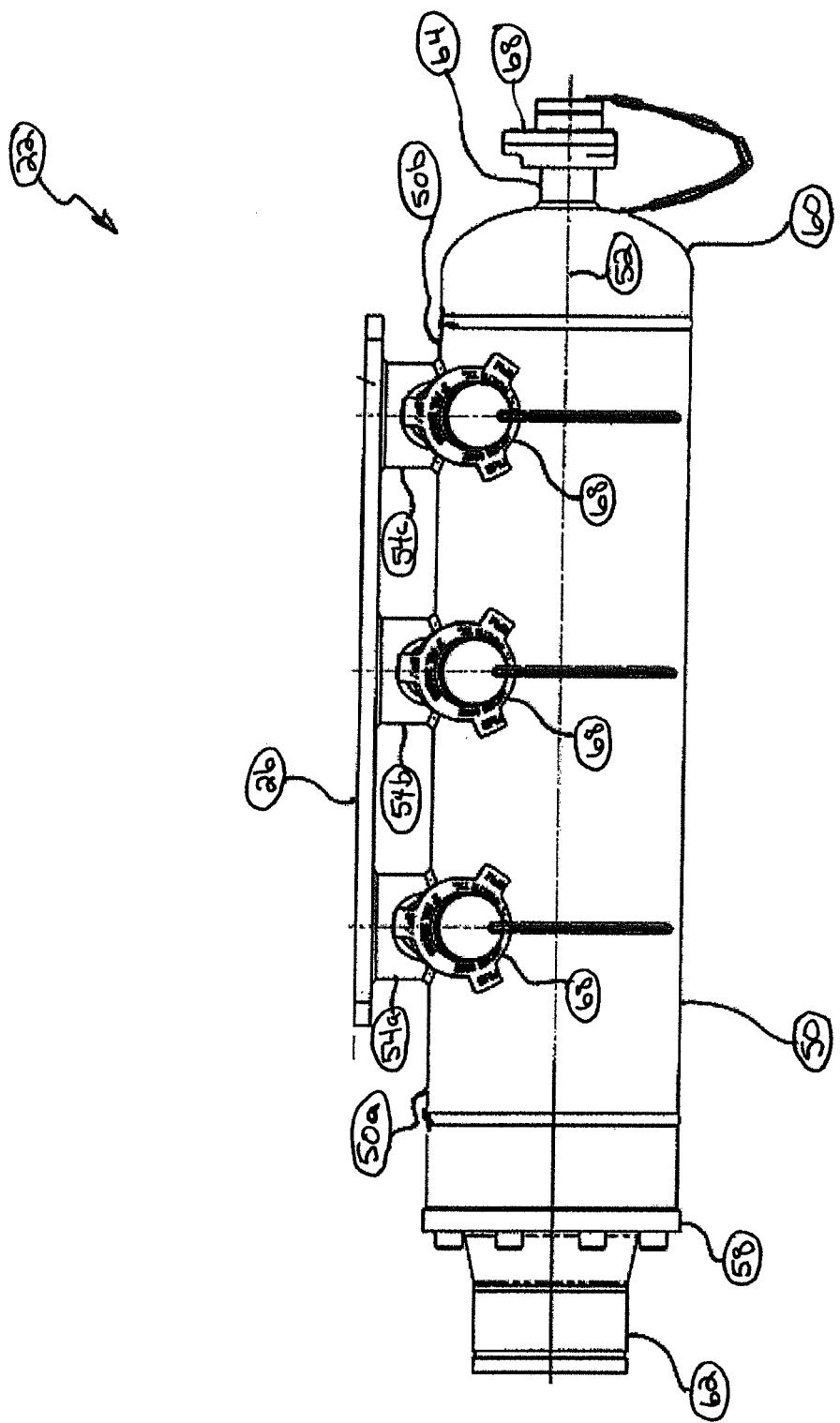
FIG. 3 is an elevational side view of the manifold of FIG. 2, according to an exemplary embodiment.
Figure 4:
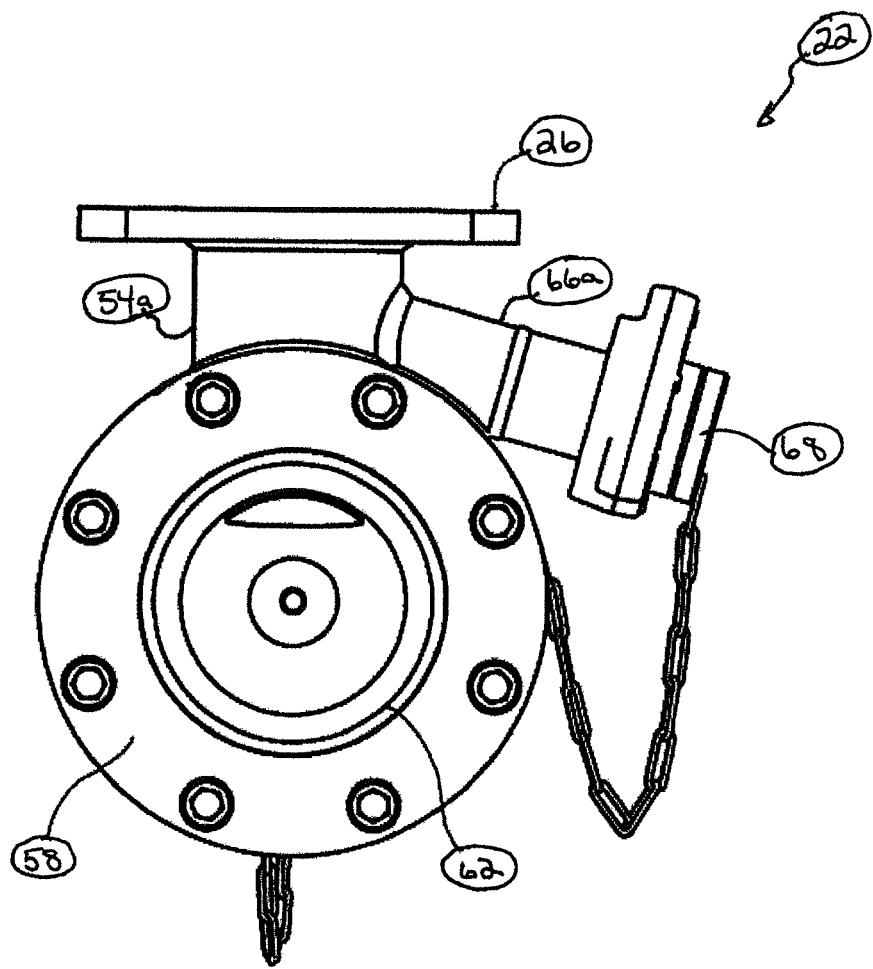
FIG. 4 is an elevational end view of the manifold of FIGS. 2 and 3, according to an exemplary embodiment.

In an exemplary embodiment, as illustrated in FIGS. 2-4 with continuing reference to FIG. 1, the suction manifold 22 of the fluid end portion 14 includes a generally cylindrical elongated manifold member 50. The elongated manifold member 50 includes opposing end portions 50a and 50b. A longitudinal axis 52 is defined by the elongated manifold member 50. Axially-spaced discharge tubes 54a, 54b, and 54c extend upwardly from the elongated manifold member 50 in a direction that is perpendicular to the longitudinal axis 52. The tubes 54a, 54b, and 54c define fluid passages 56a, 56b, and 56c, respectively (FIG. 2). Further, the tubes 54a, 54b, and 54c extend to the mounting plate 26, which mates against the bottom surface 32 of the fluid end block 18 and may be connected to respective fluid inlet members, or inlet valve housings, of the fluid end block 18. An end plate 58 is connected to the elongated manifold member 50 at the end portion 50a, and an end cap 60 is connected to the elongated manifold member 50 at the end portion 50b. A connector 62 extends from the end plate 58, and is adapted to be connected to a fluid conduit. A cleanout stem 64 extends from the end cap 60 and along the longitudinal axis 52. Valve lift stems 66a, 66b, and 66c extend from the tubes 54a, 54b, and 54c, respectively. Respective bull plug assemblies 68 are connected to each of the cleanout stem 64 and the valve lift stems 66a, 66b, and 66c.

Figure 5:
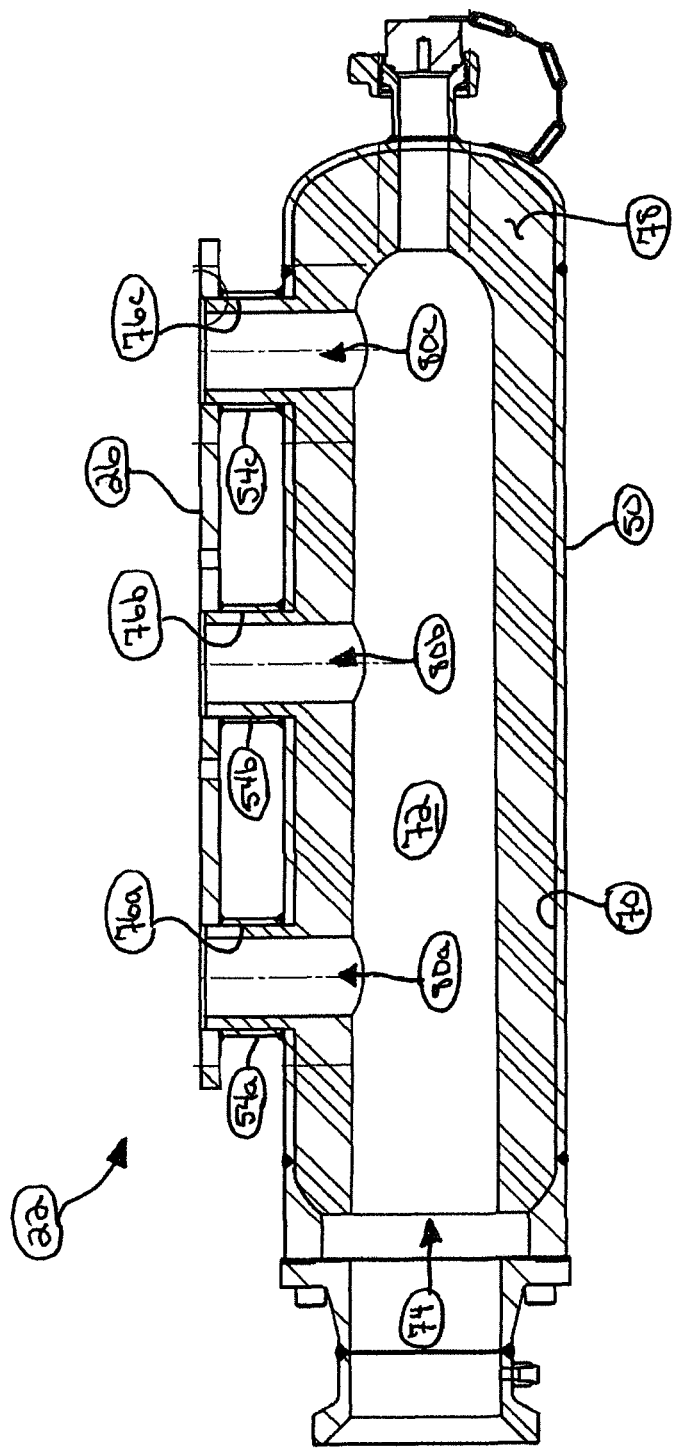
FIG. 5 is a cross-sectional side view of the manifold of FIGS. 2-4, the manifold including a fluid liner, according to an exemplary embodiment.
Figure 6:
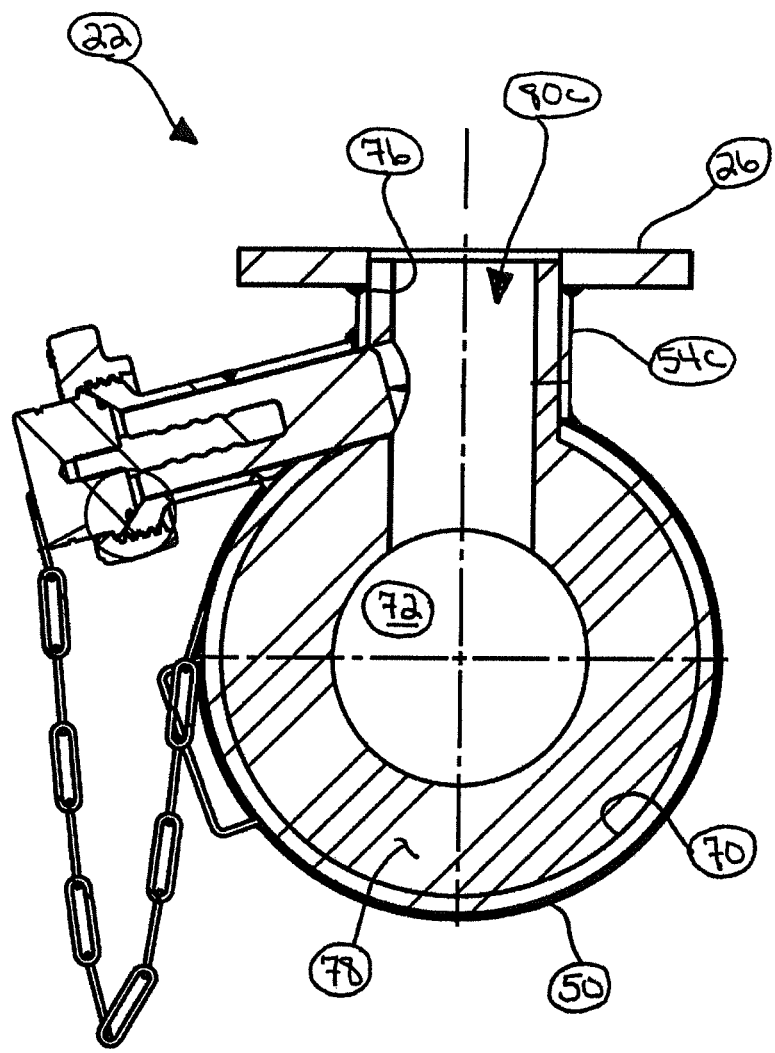
FIG. 6 is a cross-sectional end view of the manifold of FIG. 5, the manifold including a fluid liner, according to an exemplary embodiment.

In an exemplary embodiment, as illustrated in FIGS. 5 and 6, the elongated manifold member 50 defines a cylindrical inside surface 70, and at least partially defines a fluid chamber 72. The elongated manifold member 50 includes a fluid inlet 74 at one axial end portion thereof. The tubes 54a, 54b, and 54c define cylindrical inside surfaces 76a, 76b, and 76c, respectively. A single, continuous fluid liner 78 is disposed within the fluid chamber 72. In an exemplary embodiment, the fluid liner 78 is bonded to the cylindrical inside surface 70 of the elongated manifold member 50. The fluid liner 78 may also be bonded to the cylindrical inside surfaces 76a, 76b, and 76c of the respective tubes 54a, 54b, and 54c. The fluid liner 78 is adapted to dynamically respond to pressure fluctuations within the fluid chamber 72 during fluid flow therethrough while the bond between the fluid liner 78 and the cylindrical inside surface 70 and/or the bond between the fluid liner 78 and the inside surfaces 76a, 76b, and 76c is maintained. The portion of the fluid liner 78 permanently bonded to the inside surface 70 is cylindrical in shape, corresponding to the cylindrical shape of the inside surface 70. The respective portions of the fluid liner 78 bonded to the inside surfaces 76a, 76b, and 76c are cylindrical in shape, corresponding to the respective cylindrical shapes of the inside surfaces 76a, 76b, and 76c. As a result, the fluid liner 78 defines radially-extending fluid passages 80a, 80b, and 80c that are coaxial with the tubes 54a, 54b, and 54c, respectively. When the mounting plate 26 mates against the bottom surface 32 of the fluid end block 18, and is thus connected to the respective inlet valve housings of the fluid end block 18, the fluid chamber 72 is in fluid communication with the respective inlet valve housings via the fluid passages 80a, 80b, and 80c. The fluid passages 80a, 80b and 80c are axially spaced from each other so that respective portions of the fluid liner 78 extend axially between the fluid passages 80a and 80b, and between the fluid passages 80b and 80c.

The fluid liner 78 may be formed of a resilient material that includes, for example, a foaming nitrile rubber type material (also known as Buna-N, Perbunan or Nitrile Butadiene Rubber (NBR) and provided under trades names such as Nipol®, Krynac®, and Europrene®). The fluid liner 78 may be formed of a resilient material that includes, for example, nitrile rubber foam that includes at least one of a nitrile rubber, a conductive carbon black, and a plasticizer, or any combination of the foregoing. The fluid liner 78 may be formed of a resilient material that includes additional foam materials and/or non-foam materials including, but not limited to, ethylene propylene diene monomer (EPDM) rubber. The fluid liner 78 may be formed of a resilient material that includes cells filled with an inert gas such as, but not limited to, nitrogen.

In operation, with continuing reference to FIGS. 1-6, the operation of the reciprocating pump assembly 10, to which the mounting plate 26 is connected, causes fluid to be sucked or drawn into the suction manifold 22 from a fluid source. In addition to, or instead of, the fluid being drawn into the suction manifold by the operation of the reciprocating pump assembly 10, an inlet valve may be opened, allowing pressurized fluid to flow into the suction manifold 22 from the fluid source. More particularly, the fluid flows from the fluid source, through the fluid inlet 74, and into the fluid chamber 72. The fluid flows through the fluid chamber 72, and out of the fluid chamber 72 via one or more of the radially-extending fluid passages 80a, 80b and 80c. The fluid then flows out of the discharge tubes 54a, 54b, and 54c, and into the respective inlet valve housings of the fluid end block 18 of the reciprocating pump assembly 10. The fluid is subsequently drawn into the respective pressure chambers of the fluid end block 18, which are in fluid communication with the inlet valve housings. The fluid is pressurized in the pressure chambers, via the plungers 30, and discharged into the discharge manifold 28 via respective outlet valve housings that are in fluid communication with the pressure chambers.

During the above-described operation of the suction manifold 22, and thus during the flow of fluid through the suction manifold 22, pressure fluctuations occur within the fluid chamber 72 due to, for example, sudden fluid velocity changes, sudden fluid acceleration changes, acceleration-induced parameters, pressure pulses, the respective operations of valves disposed in the inlet valve housings, the pressurization of the fluid in the pressure chambers, the respective operations of valves disposed in the outlet valve housings, operational variations of the fluid source, or any combination of the foregoing. The fluid liner 78 dynamically responds to the pressure fluctuations within the fluid chamber 72 by, for example, flexing and/or undergoing compression in one or more portions thereof, while maintaining the permanent bond between the fluid liner 78 and inside surfaces 76a, 76b, and 76c. As a result, the fluid liner 78 changes the inlet fluid volume capacity of the reciprocating pump assembly in response to the pressure fluctuations within the fluid chamber 72, while maintaining the permanent bond between the fluid liner 78 and the inside surfaces 76a, 76b, and 76c. By dynamically responding to the pressure fluctuations within the fluid chamber 72, the fluid liner 78 operates to stabilize fluid velocities in the fluid chamber 72 and the radially-extending fluid passages 80a, 80b, and 80c. The fluid liner 78 dynamically responds to the pressure fluctuations within the fluid chamber 72 by, for example, dampening pulsations within the fluid chamber 72 resulting from fluid flow therethrough, absorbing water-hammering effects within the suction manifold 22, reducing or attenuating vibration within the suction manifold 22, and/or decreasing shock waves within the suction manifold 22. The fluid liner 78 can store kinetic energy generated by the motion of the fluid therethrough by local compression of the fluid liner 78. The kinetic energy can be released from the fluid liner 78, which assists the fluid acceleration into the pressure chambers of the fluid end block 18. This storing and discharging of kinetic energy increases the efficiency of the reciprocating pump assembly and reduces fluid cavitation by attenuating the pulsations and acoustical pressure waves created by accelerating and decelerating of the pumped fluid.

During the above-described operation of the suction manifold 22, the fluid may contain slurry, mud, drilling fluid, water, other types of liquids, and/or any combination thereof. The fluid may contain entrained solid particulates such as, for example, proppant, soil, mined ore particulates, tailings, etc. The fluid liner 78 operates to concentrate any entrained solid particulates in the fluid flow in the center of the elongated manifold member 50, and the center of each of the fluid passages 80a, 80b, and 80c, thereby reducing the quantity of entrained solid particulates that undesirably collect or accumulate in the suction manifold 22 and thus do not flow into the pressure chambers of the fluid end block 18.

Figure 7A:
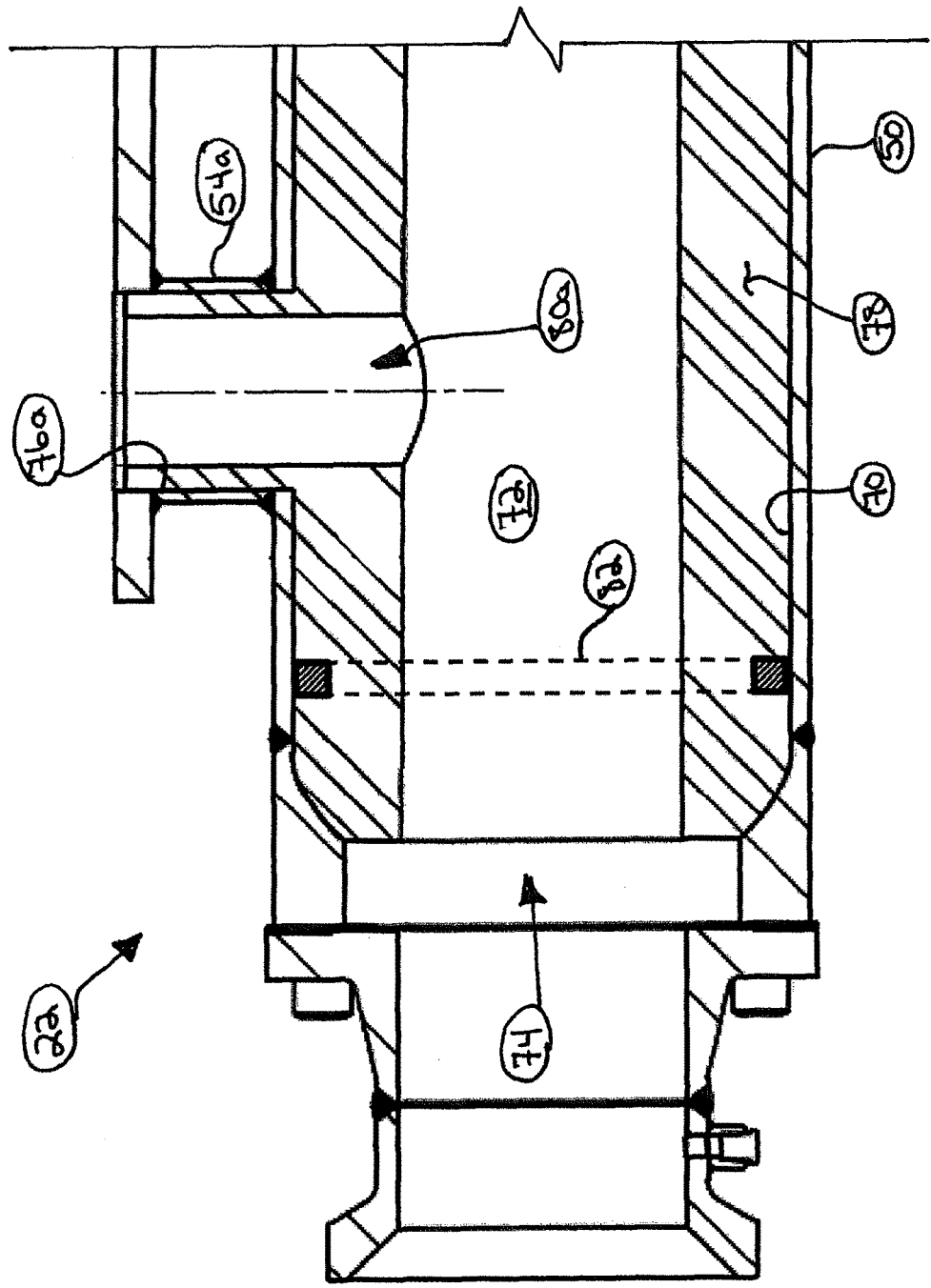
FIG. 7A is a detailed view of an exemplary embodiment of a portion of the manifold of FIG. 5, the manifold including the fluid liner and a wear indicator, according to an exemplary embodiment.
Figure 7B:
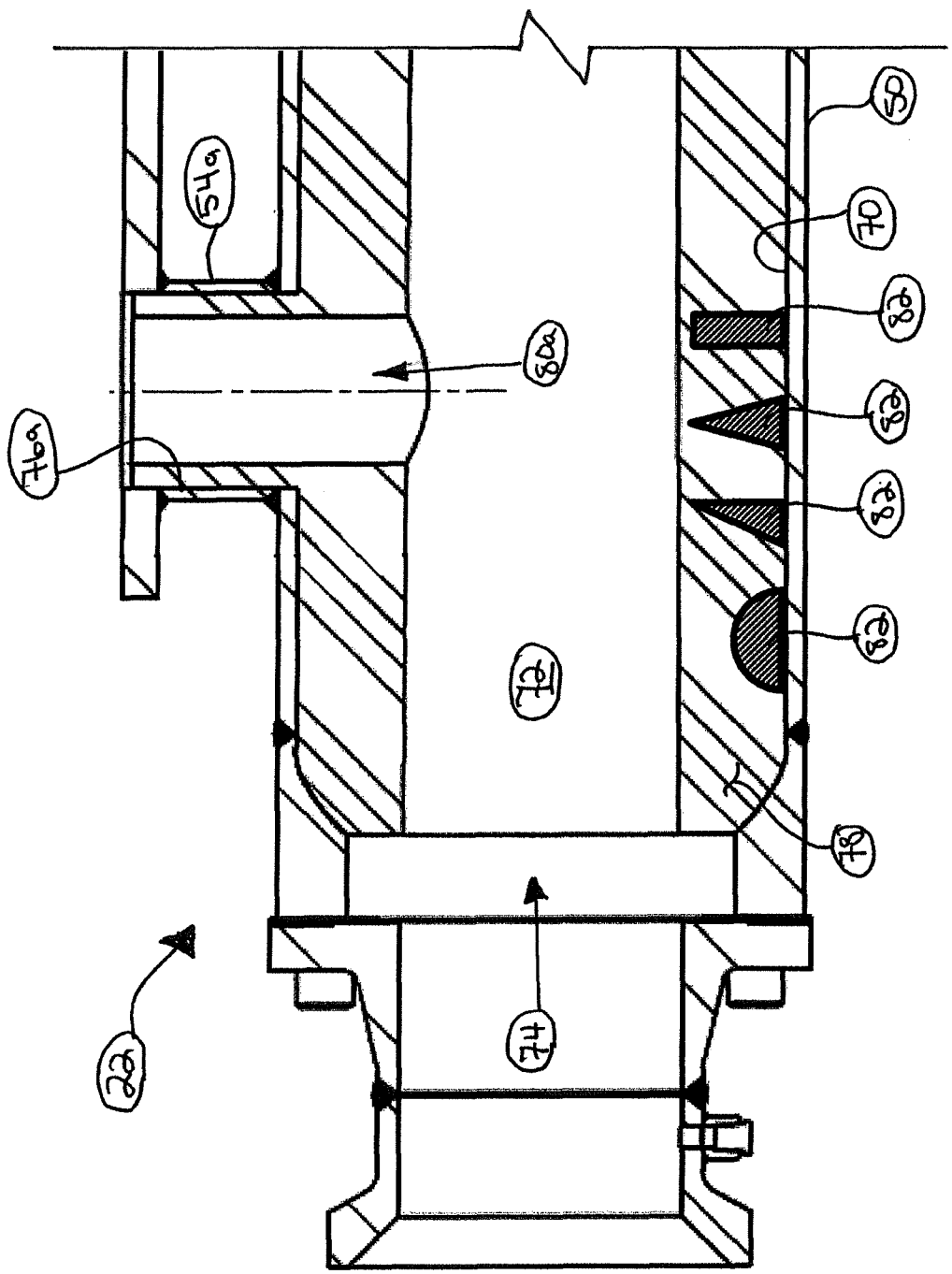
FIG. 7B is a detailed view of another exemplary embodiment of a portion of the manifold of FIG. 5, the manifold including the fluid liner and a wear indicator, according to an exemplary embodiment.
Figure 7C:
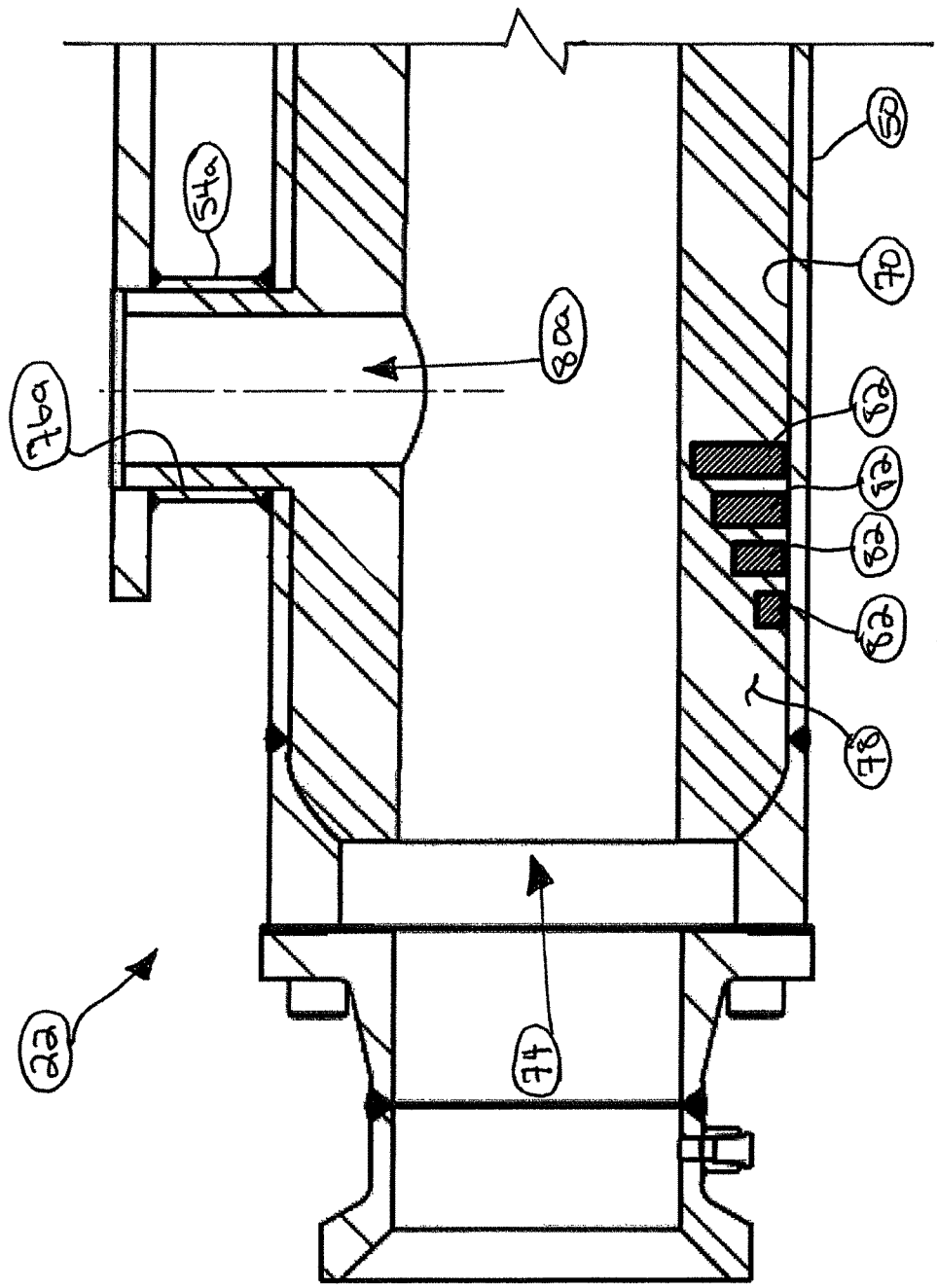
FIG. 7C is a detailed view of yet another exemplary embodiment of a portion of the manifold of FIG. 5, the manifold including the fluid liner and a wear indicator, according to an exemplary embodiment.
Figure 7D:
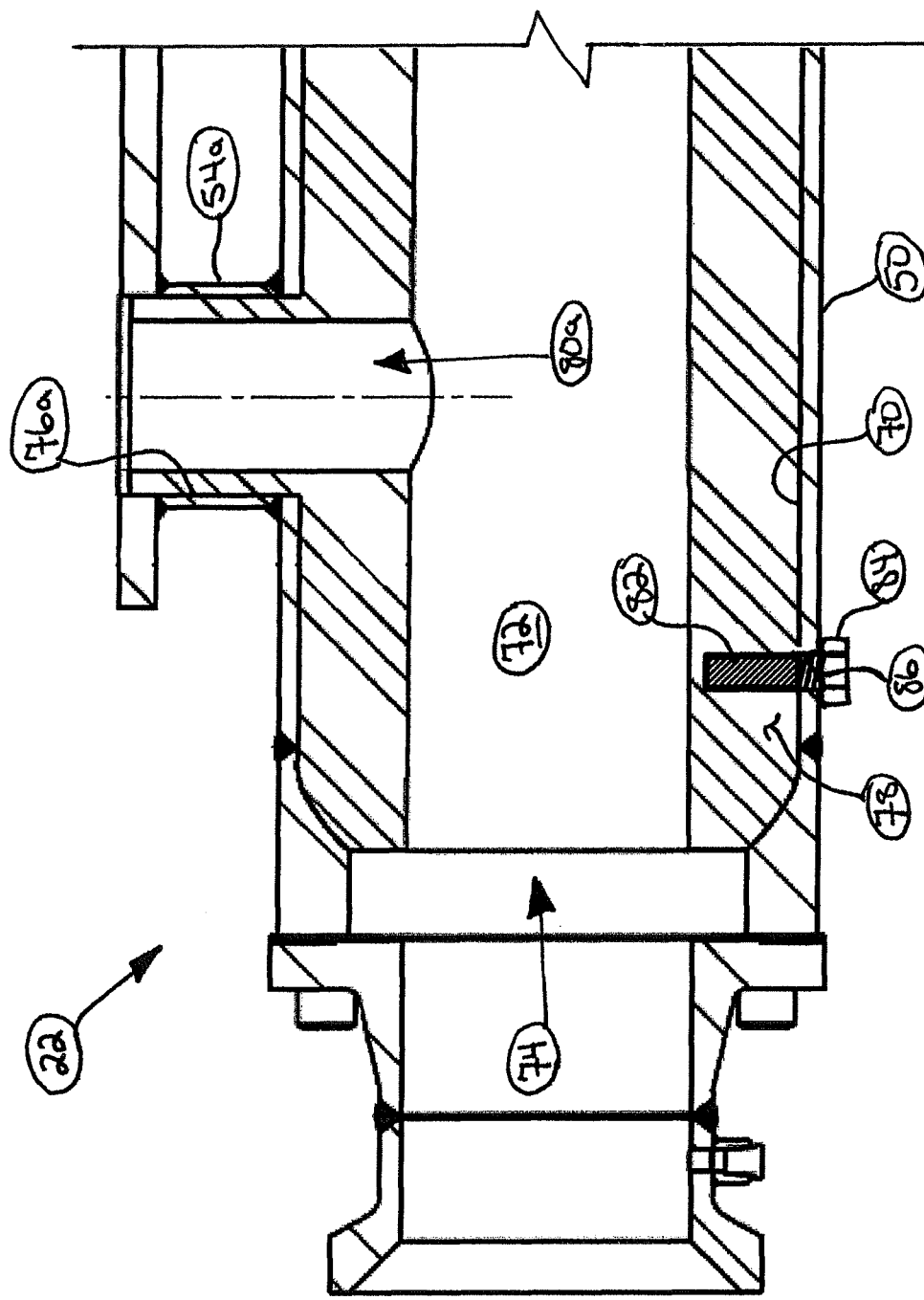
FIG. 7D is a detailed view of still yet another exemplary embodiment of a portion of the manifold of FIG. 5, the manifold including the fluid liner and a wear indicator, according to an exemplary embodiment.

In an exemplary embodiment, as illustrated in FIGS. 7A-7D with continuing reference to FIGS. 1-6, the suction manifold 22 includes a wear indicator formed in the fluid liner 78. In several exemplary embodiments, the wear indicator includes a wear body 82, at least a portion of which is embedded within the fluid liner 78. The wear body 82 is positioned radially between the cylindrical inside surface 70 of the elongated manifold member 50 and the longitudinal axis 52. In several exemplary embodiments, the wear body 82 forms an annular ring extending about a circumference of the fluid chamber 72, as shown in FIG. 7A. The shape of a cross-section of the annular wear body 82 may form any one of a number of shapes such as, for example, a circular shape, a triangular shape, a rectangular shape, a polygonal shape, another planar shape, or any combination thereof. Alternatively, in several exemplary embodiments, the wear body 82 may form a three-dimensional shape that does not extend circumferentially about the fluid chamber 72. Examples of such shapes are shown in FIG. 7B, and may include any one of a number of shapes such as, for example, a spherical shape, a prismatic shape, a pyramid shape, a cubic shape, a cylindrical shape, a conical shape, another three-dimensional shape, or any combination thereof. In several exemplary embodiments, as shown in FIG. 7D, the suction manifold 22 includes a wear indicator, the wear indicator including multiple wear bodies 82 (i.e., separate body segments). The multiple wear bodies 82 may have different sizes and/or shapes relative to one another. For example, the multiple wear bodies 82 may be graduated, or stepped, with respect to one another, as shown in FIG. 7C. In several exemplary embodiments, the wear body 82 forms a portion of a plug 84 that is threaded into the interior chamber 72 and the fluid liner 78 through a threaded port 86 in the elongated manifold member 50, as shown in FIG. 7D.

In several exemplary embodiments, one or more of the wear bodies 82 are in contact with the inside surface 70 of the elongated manifold member 50, as shown in FIGS. 7A-7D. However, in several exemplary embodiments, one or more of the wear bodies 82 are not in contact with the inside surface 70. In several exemplary embodiments, the fluid liner 78 covers one or more of the wear bodies 82, preventing any fluid that flows through the fluid chamber 72 of the suction manifold 22 from contacting the one or more wear bodies 82. As a result, the wear bodies 82 covered by the fluid liner 78 are not initially exposed to the fluid flowing through the suction manifold 22. However, in several exemplary embodiments, at least respective portions of one or more of the wear bodies 82 are not covered by the fluid liner 78, and are thus exposed to the fluid flowing through fluid chamber 72 of the suction manifold 22.

In several exemplary embodiments, one or more of the wear bodies 82 are formed of a material having an erosion rate greater than or equal to an erosion rate of the fluid liner 78. In several exemplary embodiments, one or more of the wear bodies 82 are formed of a material having an erosion rate less than the erosion rate of the fluid liner 78. In several exemplary embodiments, one or more of the wear bodies 82 are formed of a resilient material that includes, for example, a foaming nitrile rubber type material (also known as Buna-N, Perbunan or Nitrile Butadiene Rubber (NBR) and provided under trades names such as Nipol®, Krynac®, and Europrene®). In several exemplary embodiments, one or more of the wear bodies 82 is formed of a resilient material that includes, for example, nitrile rubber foam that includes at least one of a nitrile rubber, a conductive carbon black, and a plasticizer, or any combination of the foregoing. In several exemplary embodiments, one or more of the wear bodies 82 is formed of a resilient material that includes additional foam materials and/or non-foam materials including, but not limited to, ethylene propylene diene monomer (EPDM) rubber. In several exemplary embodiments, one or more of the wear bodies 82 are formed of a resilient material that includes cells filled with an inert gas such as, but not limited to, nitrogen. In several exemplary embodiments, one or more of the wear bodies 82 are formed of another material such as, for example, a metal material, a plastic material, a ceramic material, other materials, and/or any combination thereof.

During the above-described operation of the suction manifold 22, the fluid liner 78 is subject to wear and/or erosion from the entrained solid particulates and the pressure fluctuations of the fluid within the fluid chamber 72. As the fluid liner 78 erodes, the wear bodies 82 emerge from the eroding fluid liner 78 and become (or remain) exposed to the fluid flowing through the fluid chamber 72 of the suction manifold 22. Thereafter, in those embodiments where one or more of the wear bodies 82 have an erosion rate greater than or equal to the erosion rate of the fluid liner 78, the one or more wear bodies 82 erode at a rate substantially equal to the erosion rate of the fluid liner 78. However, in those embodiments where one or more of the wear bodies 82 have an erosion rate less than the erosion rate of the fluid liner 78, the one or more wear bodies 82 protrude progressively from the fluid liner 78 as the fluid liner 78 continues to erode. As material erodes from the fluid liner 78, the capability of the fluid liner 78 to dynamically respond to pressure fluctuations within the fluid chamber 72 deteriorates. To ensure peak performance, the fluid liner 78 must be replaced after a predetermined amount of material has been worn or eroded from the fluid liner 78. In order to determine whether the predetermined amount of material has eroded from the fluid liner 78, the wear bodies 82 may be visually inspected by removing the end plate 58 from the end portion 50a of the elongated manifold member 50 and/or by removing the cleanout stem 64 from the end cap 60 of the elongated manifold member 50. In those embodiments where one or more of the wear bodies 82 are in contact with the inside surface 70, the emergence of the one or more wear bodies 82 as the fluid liner 78 erodes may indicate that the fluid liner 78 needs replacement. Alternatively, in those embodiments where one or more of the wear bodies 82 are not in contact with the inside surface 70, the disappearance of the one or more wear bodies 82, i.e., the complete erosion of the wear bodies 82, may indicate that the fluid liner 78 needs replacement. In those embodiments where the suction manifold 22 includes multiple wear bodies 82 (i.e., separate body segments) that are graduated, or stepped, with respect to one another (shown in FIG. 7C), the progressive emergence (or disappearance) of the respective wear bodies 82 may indicate differing amounts of erosion from the fluid liner 78, thus indicating the remaining useful life of the fluid liner 78. Alternatively, in those embodiments where the plug 84 is employed (shown in FIG. 7D), the plug 84 itself, including the wear body 82, may be inspected upon removal of the plug 84 from the threaded port 86.

Figure 8A:
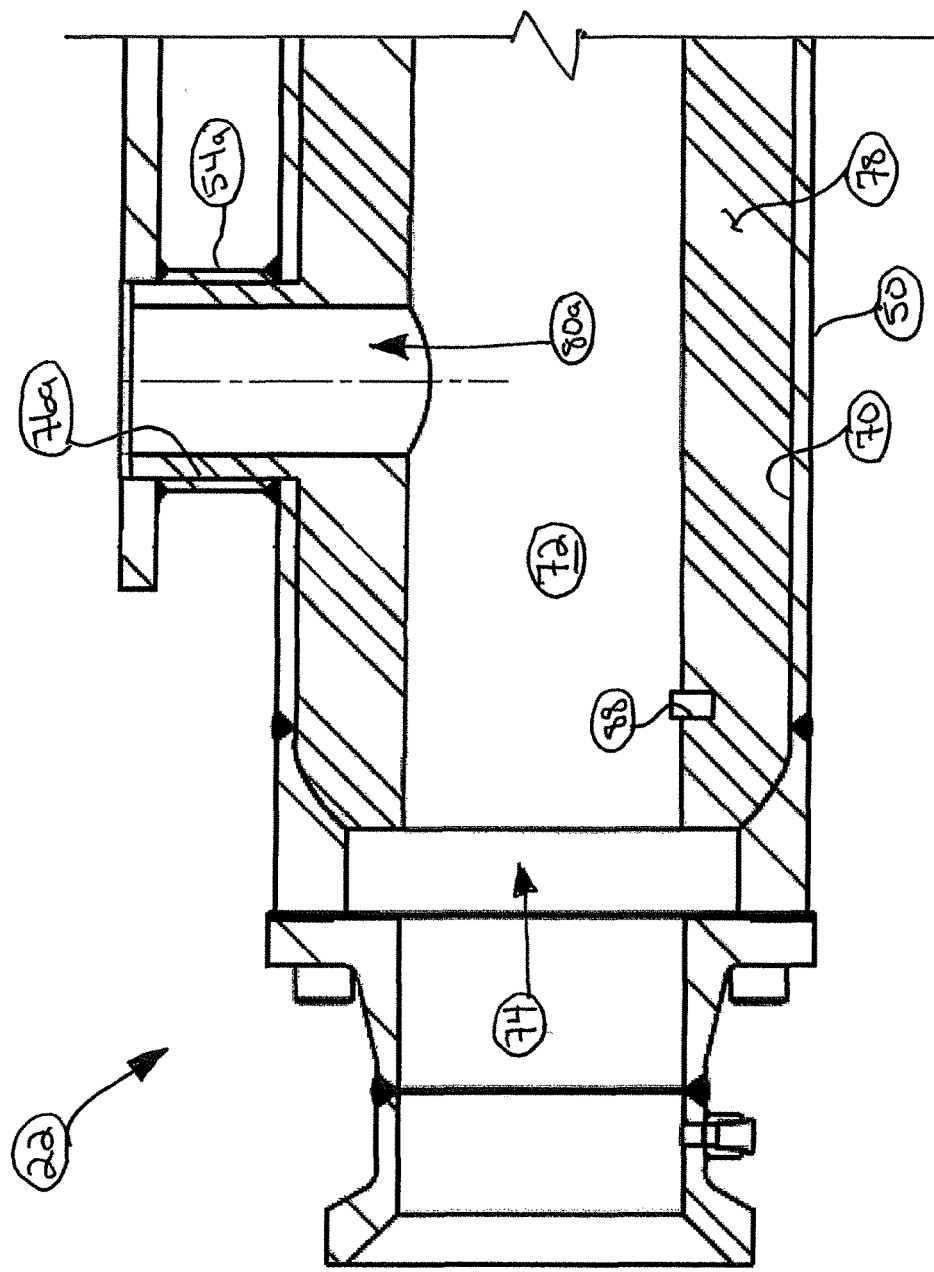
FIG. 8A is a detailed view of an exemplary embodiment of a portion of the manifold of FIG. 5, the manifold including the fluid liner and a wear indicator, according to an exemplary embodiment.
Figure 8B:
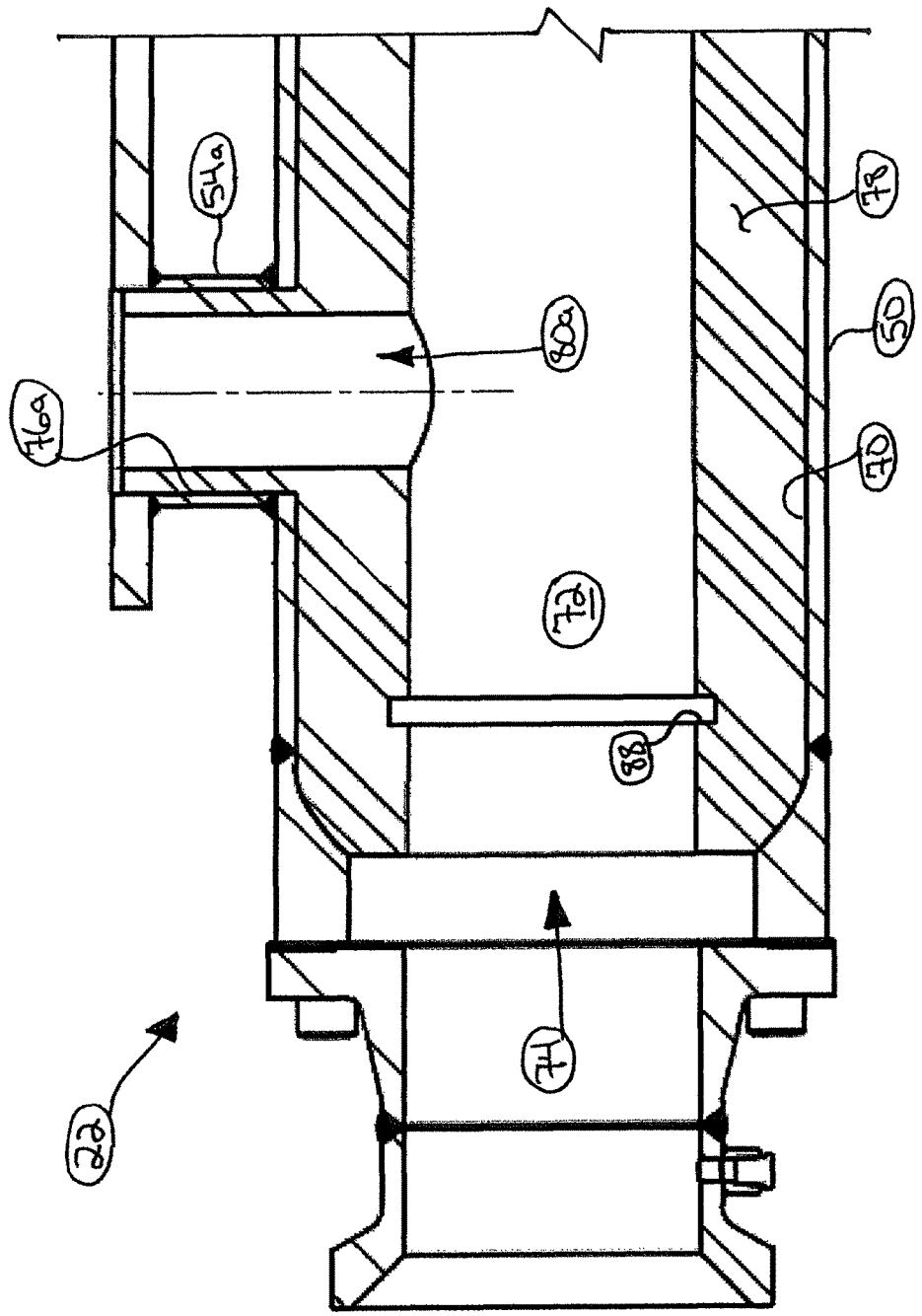
FIG. 8B is a detailed view of another exemplary embodiment of a portion of the manifold of FIG. 5, the manifold including the fluid liner and a wear indicator, according to an exemplary embodiment.
Figure 8C:
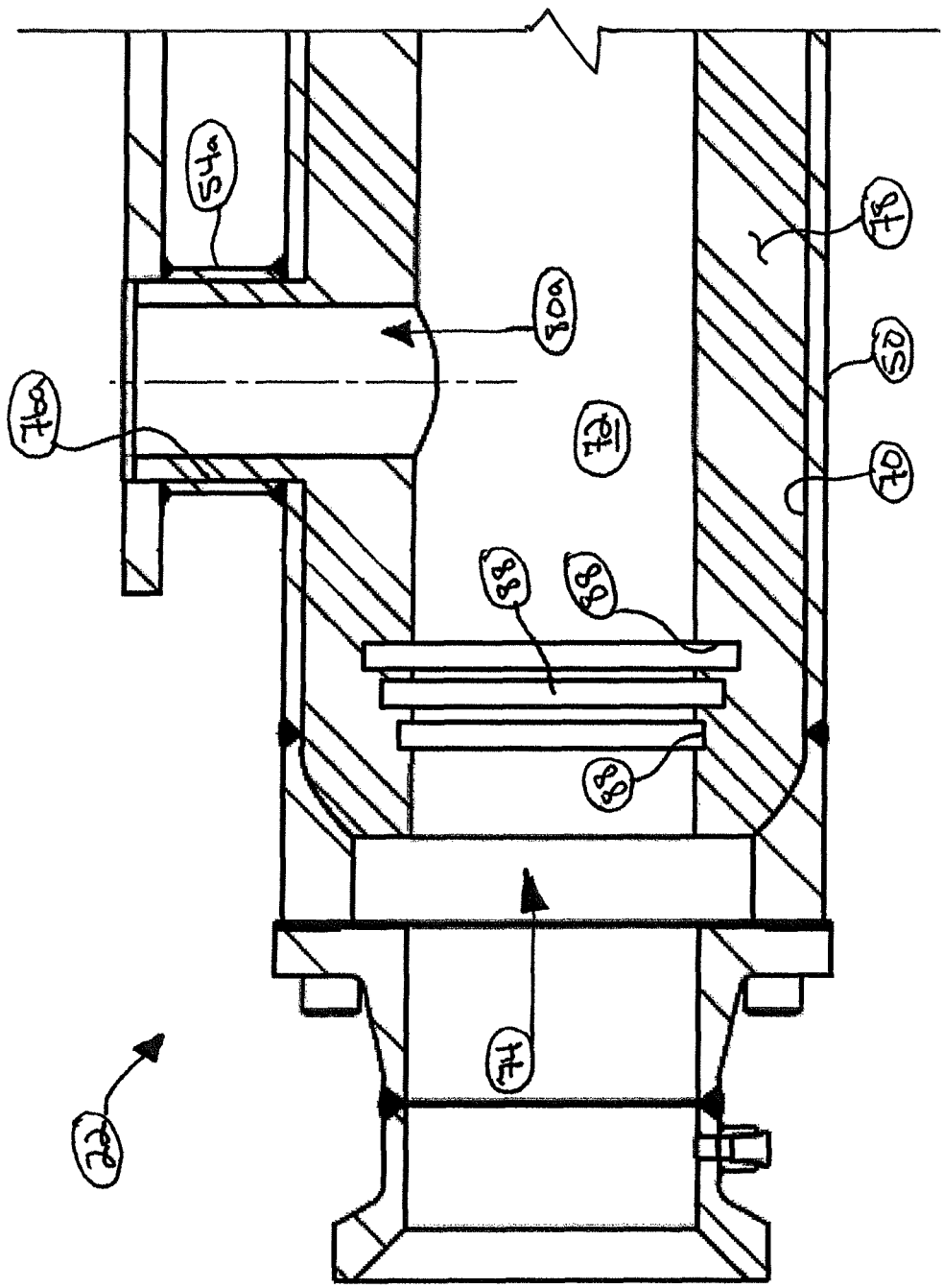
FIG. 8C is a detailed view of yet another exemplary embodiment of a portion of the manifold of FIG. 5, the manifold including the fluid liner and a wear indicator, according to an exemplary embodiment.

In another exemplary embodiment, as illustrated in FIGS. 8A-8C with continuing reference to FIGS. 1-6 and 7A-7D, instead of, or in addition to, the wear body 82, the suction manifold 22 includes another wear indicator, such as, for example, a wear groove 88 formed in the fluid liner 78. The wear groove 88 is positioned radially between the cylindrical inside surface 70 of the elongated manifold member 50 and the longitudinal axis 52. In several exemplary embodiments, the wear groove 88 forms a three-dimensional shape that does not extend circumferentially about the fluid chamber 72, as shown in FIG. 8A. Examples of such shapes may include, but are not limited to, a spherical shape, a prismatic shape, a pyramid shape, a cubic shape, a cylindrical shape, a conical shape, another three-dimensional shape, or any combination thereof. In several exemplary embodiments, the wear groove 88 forms an annular groove extending about a circumference of the fluid chamber 72, as shown in FIG. 8B. The shape of a cross-section of the annular wear groove 88 may form any one of a number of shapes such as, for example, a circular shape, a triangular shape, a rectangular shape, a polygonal shape, another planar shape, or any combination thereof. In several exemplary embodiments, as shown in FIG. 8C, the suction manifold 22 includes a wear groove, the wear groove including multiple wear grooves 88 (i.e., separate groove segments). The multiple wear grooves 88 may form a pattern in the interior of the fluid liner 78. Additionally, the multiple wear grooves 88 may have different sizes, shapes, and or depths relative to one another. For example, the respective depths of the multiple wear grooves 88 may be graduated, or stepped, with respect to one another, as shown in FIG. 8C.

In several exemplary embodiments, one or more of the wear grooves 88 are formed in the interior of the fluid liner 78, as shown in FIGS. 8A-8C. As a result, at least respective portions of the one or more wear grooves 88 are not covered by the fluid liner 78 and are thus exposed to the fluid flowing through fluid chamber 72 of the suction manifold 22. However, in several exemplary embodiments, one or more of the wear grooves are not formed in the interior of the fluid liner 78 so that the fluid liner 78 covers at least respective portions of one or more of the wear grooves 88. As a result, the fluid liner 78 initially prevents any fluid that flows through the fluid chamber 72 of the suction manifold 22 from contacting the one or more wear grooves 88.

As discussed, during the above-described operation of the suction manifold 22, the fluid liner 78 is subject to wear and/or erosion from the entrained solid particulates and the pressure fluctuations of the fluid within the fluid chamber 72. As the fluid liner 78 erodes, the respective depths of the wear grooves 88 gradually diminish until one or more of the wear grooves disappears entirely. As material erodes from the fluid liner 78, the capability of the fluid liner 78 to dynamically respond to pressure fluctuations within the fluid chamber 72 deteriorates. To ensure peak performance, the fluid liner 78 must be replaced after a predetermined amount of material has been worn or eroded from the fluid liner 78. In order to determine whether the predetermined amount of material has eroded from the fluid liner 78, the wear grooves 88 may be visually inspected by removing the end plate 58 from the end portion 50a of the elongated manifold member 50 and/or by removing the cleanout stem 64 from the end cap 60 of the elongated manifold member 50. In those embodiments where one or more of the wear grooves 88 are formed in the interior of the fluid liner 78, the degree to which the respective depths of the one or more wear grooves 88 has diminished (or the complete disappearance of one or more of the wear grooves 88), may indicate that the fluid liner 78 needs replacement. Alternatively, in those embodiments where one or more of the wear grooves 88 are not formed in the interior of the fluid liner 78, the emergence of the one or more wear grooves 88 as the fluid liner 78 erodes may indicate that the fluid liner 78 needs replacement. Finally, in those embodiments where the suction manifold 22 includes grooves 88 that are graduated, or stepped, with respect to one another (shown in FIG. 8C), the progressive emergence (or disappearance) of the respective wear grooves 88 may indicate differing amounts of erosion from the fluid liner 78, thus indicating the remaining useful life of the fluid liner 78.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A manifold through which a fluid is adapted to flow, the manifold comprising:
    an elongated member at least partially defining a fluid chamber through which the fluid is adapted to flow, a longitudinal axis, and an interior surface, the elongated member comprising: one or more inlets via which the fluid flows into the fluid chamber; and one or more outlets via which the fluid flows out of the fluid chamber;
    a fluid liner disposed within the fluid chamber and adapted to dynamically respond to pressure fluctuations within the fluid chamber as the fluid flows therethrough, the fluid liner being subject to at least one of wear and erosion due to the flow of the fluid therethrough and the dynamic response of the fluid liner to the pressure fluctuations; and
    a wear indicator positioned radially between the interior surface of the elongated member and the longitudinal axis, the wear indicator comprising a wear groove formed in the fluid liner and devoid of any component of the manifold;
    wherein the wear indicator is adapted to indicate the degree to which the fluid liner has been subjected to the at least one of wear and erosion.

2. The manifold of claim 1, wherein the wear indicator further comprises a wear body embedded in the fluid liner, the wear body comprising a plurality of separate body segments that are graduated, or stepped, with respect to one another, wherein at least one of the wear segments is spaced from the longitudinal axis at a different distance than at least another one of the wear segments, at least respective portions of the body segments being embedded in the fluid liner.

3. The manifold of claim 1, wherein the wear indicator further comprises a wear body embedded in the fluid liner, the wear body forming a non-annular three-dimensional shape.

4. The manifold of claim 1, wherein the wear indicator further comprises a wear body embedded in the fluid liner, the wear body being in contact with the interior surface of the elongated member.

5. The manifold of claim 1, wherein the wear indicator further comprises a wear body embedded in the fluid liner, at least a portion of the fluid liner extending between the wear body and the interior surface of the elongated member so that the wear body does not contact the interior surface of the elongated member.

6. The manifold of claim 1, wherein the wear indicator further comprises a wear body embedded in the fluid liner, the fluid liner covering the wear body so that at least a portion of the fluid liner extends between the wear body and the longitudinal axis of the elongated member, thereby initially preventing the fluid that flows through the fluid chamber from contacting the wear body.

7. The manifold of claim 1, wherein the wear indicator further comprises a wear body embedded in the fluid liner, the wear body being formed of a first material and the fluid liner being formed of a second material that is different from the first material.

8. The manifold of claim 1, wherein the wear groove comprises a plurality of separate groove segments that are graduated, or stepped, with respect to one another, wherein at least one of the groove segments is spaced from the longitudinal axis at a different distance than at least another one of the groove segments.

9. The manifold of claim 1, wherein the wear groove defines a non-annular three-dimensional shape.

10. The manifold of claim 1, wherein the wear groove is formed in the interior of the fluid liner.

11. The manifold of claim 1, wherein the wear indicator further comprises a wear body embedded in the fluid liner and having an erosion rate less than that of the fluid liner, wherein, as the fluid liner at least one of wears and erodes, the wear body protrudes from the fluid liner to an increasing degree.

12. A fluid end portion for a reciprocating pump assembly, the fluid end portion comprising:
    a fluid end block, comprising:
        a pressure chamber;

a plunger adapted to reciprocate within the pressure chamber; and a discharge manifold in fluid communication with the pressure chamber;

and a suction manifold through which a fluid is adapted to flow, the suction manifold being connected to the fluid end block and comprising:

an elongated member at least partially defining a fluid chamber through which the fluid is adapted to flow, a longitudinal axis, and an interior surface, the elongated member comprising: an inlet via which the fluid flows into the fluid chamber; and an outlet via which the fluid flows out of the fluid chamber, the outlet being in fluid communication with the pressure chamber;

a fluid liner disposed within the fluid chamber and adapted to dynamically respond to pressure fluctuations within the fluid chamber as the fluid flows therethrough, the fluid liner being subject to at least one of wear and erosion due to the flow of the fluid therethrough and the dynamic response of the fluid liner to the pressure fluctuations; and a wear indicator positioned radially between the interior surface of the elongated member and the longitudinal axis, the wear indicator comprising a wear groove formed in the fluid liner and devoid of any component of the manifold;

wherein the wear indicator is adapted to indicate the degree to which the fluid liner has been subjected to the at least one of wear and erosion.

13. The fluid end portion of claim 12, wherein the wear indicator further comprises a wear body embedded in the fluid liner, the wear body comprising a plurality of separate body segments that are graduated, or stepped, with respect to one another, wherein at least one of the wear segments is spaced from the longitudinal axis at a different distance than at least another one of the wear segments, at least respective portions of the body segments of the wear body being embedded in the fluid liner.

14. The fluid end portion of claim 12, wherein the wear indicator further comprises a wear body embedded in the fluid liner, the wear body forming a non-annular three-dimensional shape.

15. The fluid end portion of claim 12, wherein the wear indicator further comprises a wear body embedded in the fluid liner, the wear body being in contact with the interior surface of the elongated member.

16. The fluid end portion of claim 12, wherein the wear indicator further comprises a wear body embedded in the fluid liner, at least a portion of the fluid liner extending between the wear body and the interior surface of the elongated member so that the wear body does not contact the interior surface of the elongated member.

17. The fluid end portion of claim 12, wherein the wear indicator further comprises a wear body embedded in the fluid liner, the fluid liner covering the wear body so that at least a portion of the fluid liner extends between the wear body and the longitudinal axis of the elongated member, thereby preventing the fluid that flows through the fluid chamber from contacting the wear body.

18. The fluid end portion of claim 12, wherein the wear indicator further comprises a wear body embedded in the fluid liner, the wear body being formed of a first material and the fluid liner being formed of a second material that is different from the first material.

19. The fluid end portion of claim 12, wherein the wear groove comprises a plurality of separate groove segments that are graduated, or stepped, with respect to one another, wherein at least one of the groove segments is spaced from the longitudinal axis at a different distance than at least another one of the groove segments.

20. The fluid end portion of claim 12, wherein the wear groove defines a non-annular three-dimensional shape.

21. The fluid end portion of claim 12, wherein the wear groove is formed in the interior of the fluid liner.

22. The fluid end portion of claim 12, wherein the wear indicator further comprises a wear body embedded in the fluid liner and having an erosion rate less than that of the fluid liner, wherein, as the fluid liner at least one of wears and erodes, the wear body protrudes from the fluid liner to an increasing degree.

* * * * *